(12) United States Patent
Eskildsen et al.

(10) Patent No.: US 11,564,114 B2
(45) Date of Patent: Jan. 24, 2023

(54) PREMISES COMMUNICATION HUB

(71) Applicant: Ademco Inc., Golden Valley, MN (US)

(72) Inventors: Kenneth Eskildsen, Great Neck, NY (US); Mark O'Keefe, San Diego, CA (US)

(73) Assignee: ADEMCO INC., Golden Valley, MN (US)

( * ) Notice: Subject to any disclaimer, the term of this patent is extended or adjusted under 35 U.S.C. 154(b) by 90 days.

(21) Appl. No.: 17/141,303

(22) Filed: Jan. 5, 2021

(65) Prior Publication Data

US 2022/0217551 A1    Jul. 7, 2022

(51) Int. Cl.
*H04W 24/04* (2009.01)
*H04L 12/10* (2006.01)
*G16Y 30/00* (2020.01)

(52) U.S. Cl.
CPC ............ *H04W 24/04* (2013.01); *H04L 12/10* (2013.01); *G16Y 30/00* (2020.01)

(58) Field of Classification Search
CPC ....... H04W 24/04; H04L 12/00; G16Y 30/00; H04M 11/062; H04M 3/42314
See application file for complete search history.

(56) References Cited

U.S. PATENT DOCUMENTS

| | | | |
|---|---|---|---|
| 10,349,387 B2 | 7/2019 | Nenner et al. | |
| 10,530,420 B2 | 1/2020 | Turner | |
| 10,886,776 B1 * | 1/2021 | Dias | ....... G05B 11/32 |
| 2009/0015204 A1 * | 1/2009 | Rosenwald | ............ H02J 9/061 320/134 |
| 2020/0184818 A1 | 6/2020 | Becker et al. | |
| 2020/0235607 A1 | 7/2020 | Kanarellis et al. | |

FOREIGN PATENT DOCUMENTS

| | | |
|---|---|---|
| WO | 2011123126 A1 | 10/2011 |
| WO | 2020041371 A1 | 2/2020 |

OTHER PUBLICATIONS

Etherington "The best Wi-Fi 6 home networking tech to upgrade your setup" Retrieved from https://techcrunch.com/2020/07/09/the-best-wifi-6-home-networking-tech-to-upgrade-your-setup/ dated Jul. 9, 2020, 10 pgs.
International Application No. PCT/US2022/011079 International Search Report and Written Opinion dated Apr. 21, 2022, 15 pgs.

* cited by examiner

*Primary Examiner* — Chandrahas B Patel
(74) *Attorney, Agent, or Firm* — Fredrikson & Byron, P.A.

(57) ABSTRACT

A premises communication hub includes a primary communications module, a secondary communications module, a power supply, and a charging module. The primary communications module is configured to receive a premises signal from a premises device and transmit an external signal to a remote server. The secondary communications module is configured to receive the premises signal from the premises device and transmit the external signal to the remote server. The power supply includes a primary power input configured to receive power from a primary power source and a secondary power input configured to receive power from a secondary power source. The power supply is electrically connected to the primary communications module and the secondary communications module. And, the charging module is electrically connected to the secondary power source and configured to recharge the secondary power source.

16 Claims, 3 Drawing Sheets

PREMISES COMMUNICATION HUB

TECHNICAL FIELD

This disclosure relates generally to premises communication hubs as well as systems and methods relating to premises communication hubs. More specifically, this disclosure describes premises communication hub embodiments that can be configured, for instance, to participate in a communication architecture ecosystem at a premise and provide improved reliability for such communications.

BACKGROUND

The number of network-connected devices at a premise is increasing. However, oftentimes such network-connected devices at a premise may utilize different network communication protocols. For instance, network-connected devices from one manufacturer may use a different communication protocol for network communications than network-connected devices from another manufacturer. Proposals for a standard network communication protocol have been made with the aim to facilitate a premise ecosystem where all devices can join the ecosystem without the end user needing to be concerned with communication protocol compatibility.

SUMMARY

This disclosure in general describes premises communication hub embodiments as well as related systems and methods. In particular, embodiments disclosed herein can, for instance, facilitate enhanced reliability for premises communications over a communication architecture ecosystem at the premise and to/from a remote server.

Proposals for a standard network communication protocol can facilitate premise device communication protocol compatibility by channeling premise device communications through a wireless router. However, such wireless routers will cease to operate during a power or network outage at the premise. While this may not pose significant problems for certain premise network communications, it can be problematic for more sensitive premise network communications channeled through the wireless router. For example, channeling life safety type communications through such a wireless router, for the purpose of protocol compatibility, can be problematic since a power or network outage at the premise can prevent life safety communications from being transmitted outside of the premise.

Accordingly, the present disclosure describes embodiments that can be suitable for facilitating premise device communication protocol compatibility while at the same time providing sufficient capabilities for routing sensitive premise network communications (e.g., life safety type communications) in the event of a power or network outage at the premise. For example, premises communication hub embodiments described herein can help facilitate backup communication from a premises device to a remote server. In some such embodiments, the premises communication hub can support communication from a premises device to a remote server in the event of a power loss at the premise, network outage at the premise, or other disruption to the premises network. In some embodiments of the premises communication hub, life safety and/or critical signals can be transmitted to a remote server if primary power to the premises communication hub is lost, thereby helping to ensure proper communication of life safety and/or critical alerts. As a result, embodiments herein can facilitate premise device communication protocol compatibility at the premises communication hub while also including features that can support channeling life safety and/or critical alerts through the premises communication hub.

One embodiment includes a premises communication hub. The premises communication hub includes a primary communications module, a secondary communications module, a power supply, and a charging module. The primary communications module is configured to receive a premises signal from a premises device and transmit an external signal to a remote server. The secondary communications module is configured to receive the premises signal from the premises device and transmit the external signal to the remote server. The power supply includes a primary power input configured to receive power from a primary power source and a secondary power input configured to receive power from a secondary power source. The power supply is electrically connected to the primary communications module and configured to supply power to the primary communications module. The power supply is electrically connected to the secondary communications module and configured to supply power to the secondary communications module. And, the charging module is electrically connected to the secondary power source and configured to recharge the secondary power source.

In a further embodiment of the premises communication hub, the premises communication hub includes a supervision module. The supervision module is configured to monitor a status of a communication channel between the premises device and at least one of the primary communications module and the secondary communications module. When the communication channel between the premises device and the at least one of the primary communications module and the secondary communications module is inoperable, the supervision module is configured to cause a notification signal to be transmitted to the remote server. For example, the supervision module can be configured to monitor the status of the communication channel between the premises device and the secondary communications module. In such example, the supervision module can be electrically connected to the power supply, and the supervision module can be configured to cause the notification signal to be transmitted to the remote server via the secondary communications module.

In a further embodiment of the premises communication hub, the secondary communications module is configured to receive the premises signal from the premises device and transmit the external signal to the remote server when the primary communications module is inoperable. As one example, the secondary communications module can be configured to receive the premises signal from the premises device and transmit the external signal to the remote server when the power supply does not receive power from the primary power source. As another example, when the primary communications module is inoperable, the power supply can be configured to supply power, from the secondary power source, to the secondary communications module. For instance, when the power supply does not receive power from the primary power source, the power supply can be configured to supply power, from the secondary power source, to the secondary communications module.

In a further embodiment of the premises communication hub, the primary communications module can be configured to receive the premises signal from the premises device via a standard Internet of Things (IoT) protocol. And, the secondary communications module can be configured to receive the premises signal from the premises device via the standard IoT protocol. For example, the standard IoT protocol can be a standard protocol that unifies communications across a premises network such that different devices (e.g., made by different manufacturers) in the premises network can communication with each other via the standard IoT protocol (e.g., by routing messages between the devices through the premises communication hub).

In a further embodiment of the premises communication hub, the secondary communications module can include a cellular communication module configured to transmit the external signal via a cellular network. In some embodiments, the secondary power source can include a battery. In some embodiments, the premises device can include a life safety device.

Another embodiment includes a method. This method includes the step of receiving, at a primary communications module of a premises communication hub, a premises signal from a premises device and transmitting, from the primary communications module of the premises communication hub, an external signal to the remote server. The method also includes the step of supplying power to the primary communications module from a power supply of the premises communications hub. The power supply includes a primary power input configured to receive power from a primary power source, and the power supply is electrically connected to the primary communications module. When the primary communications module is inoperable, the method includes the step of receiving, at a secondary communications module of the premises communication hub, the premises signal from the premises device and transmitting, from the secondary communications module of the premises communication hub, the external signal to the remote server. The method also includes the step of supplying power to the secondary communications module from the power supply of the premises communications hub. The power supply includes a secondary power input configured to receive power from a secondary power source, and the power supply is electrically connected to the secondary communications module. And, the method includes the step of charging the secondary power source via a charging module of the premises communications hub electrically connected to the secondary power source.

In a further embodiment of this method, the power is supplied from the power supply to the secondary communications module when the primary communications module is inoperable (e.g., power can be supplied simultaneously to both the primary communications module and the secondary communications module such that, when the primary communications module is inoperable the secondary communications module continues to receive power from the power supply). As one such example, this method can additionally include the step of monitoring, via a supervision module of the premises communication hub, a status of a communication channel between the premises device and at least one of the primary communications module and the secondary communications module. The supervision module can be configured to monitor whether the primary communications module and the secondary communications module have the ability to communication with the remote server, and the supervision module can transmit a communication channel status message to the remote server via the primary and/or secondary communications module. When the communication channel between the premises device and the at least one of the primary communications module and the secondary communications module is inoperable (e.g., when the communication channel between the premises device and the primary communications module in inoperable), the method can include causing, via the supervision module, a notification signal to be transmitted to the remote server. For instance, the supervision module can monitor the status of the communication channel between the premises device and the secondary communications module, and the supervision module can cause the notification signal to be transmitted to the remote server via the secondary communications module.

In a further embodiment of this method, the primary communications module can receive the premises signal from the premises device via a standard IoT protocol, and the secondary communications module can receive the premises signal from the premises device via the standard IoT protocol.

In a further embodiment of this method, the secondary communications module includes a cellular communication module, and the external signal is transmitted from the secondary communications module via a cellular network.

An additional embodiment includes a system. This system includes a remote server located away from a premises, a premises device located at the premises, and a premises communication hub located at the premises. The premises communication hub includes a primary communications module, a secondary communications module, a power supply, and a charging module. The primary communications module is configured to receive a premises signal from the premises device and transmit an external signal to the remote server. The secondary communications module is configured to receive the premises signal from the premises device and transmit the external signal to the remote server. The power supply includes a primary power input configured to receive power from a primary power source and a secondary power input configured to receive power from a secondary power source. The power supply is electrically connected to the primary communications module and configured to supply power to the primary communications module. The power supply is also electrically connected to the secondary communications module and configured to supply power to the secondary communications module. And, the charging module is electrically connected to the secondary power source and configured to recharge the secondary power source.

In a further embodiment of this system, the premises communication hub also includes a supervision module configured to monitor a status of a communication channel between the premises device and at least one of the primary communications module and the secondary communications module. When the communication channel between the premises device and the at least one of the primary communications module and the secondary communications module is inoperable, the supervision module is configured to cause a notification signal to be transmitted to the remote server. For example, the premises device can be selected from the group consisting of: a smoke detector, a heat detector, a carbon monoxide detector, a medical panic device, a police panic device, a window sensor, and a door sensor.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
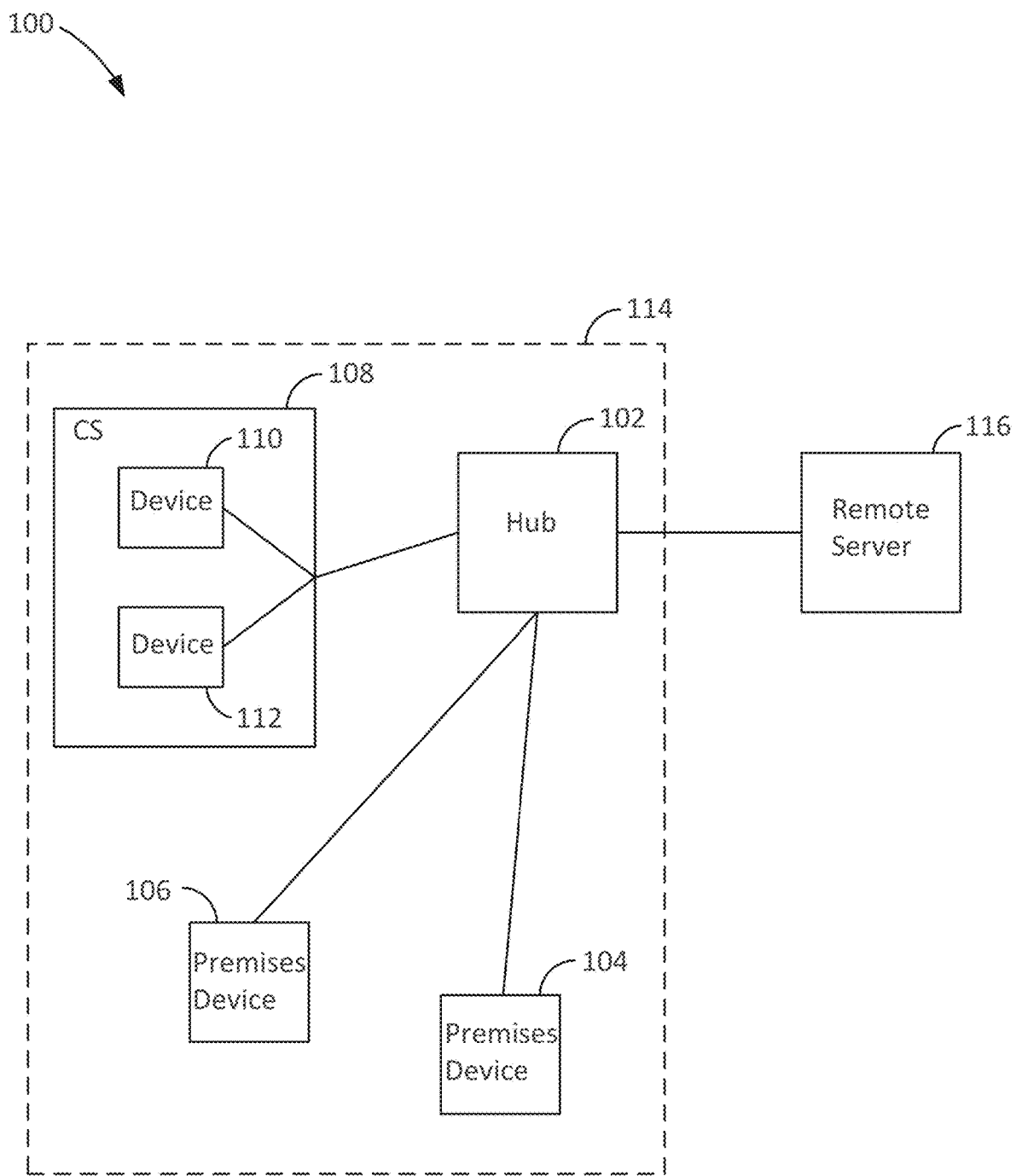
FIG. 1 is a block diagram of an embodiment of a system that includes a premises communication hub according to an aspect of the present disclosure.

FIG. 1 shows one exemplary embodiment of a system 100 including a premises communication hub 102 according to an aspect of the present disclosure. The system 100 includes the premises communication hub 102 and one or more premises devices 104, 106 which are in communication with the premises communication hub 102. The system 100 also includes a control system 108 which comprises devices 110, 112. The devices 110, 112 are in communication with the control system 108 which is in communication with premises communication hub 102. The premises communication hub 102, the premises devices 104, 106, and the control system 108 comprising device 110, 112 are all at a premises 114. The premises communication hub 102 is further in communication with a remote server 116. In the embodiment of FIG. 1, the remote server 116 is located away from the premises 114.

In some embodiments, the control system 108 comprising one or more devices 110, 112 can be a security system which comprises security devices 110, 112. In some such embodiments, the devices 110, 112 can be video cameras, alarms, motion detectors, contact sensors, other sensors which monitor a premises (e.g., for possible intrusions) and other security devices. The devices 110, 112 can communicate with the control system 108 and provide data associated with a status (e.g., a security status) of the premises 114. The control system 108 can relay the data through the premises communication hub 102 to the remote server 116 where it can be used to, for example, provide an alert to a preset contact. In some examples, the remote server 116 can represent one or more internet servers. In some examples, devices such as a remote user device (e.g. cellphone or other remote computing device) can be in communication with the remote server 116 and can send and receive signals and/or data from the remote server 116.

In some embodiments, the control system 108 comprising one or more devices 110, 112 can be a network device which controls one or more other devices. For example, the control system 108 can be a Wi-Fi router which provides a wireless network. The control system 108 can then communicate with the one or more devices 110, 112 which can be Wi-Fi compatible devices. In such examples, the one or more devices 110, 112 can connect to the control system 108 which communicates with the premises communication hub 102, which further communicates with the remote server 116. The one or more devices 110, 112 can connect and communicate with the remote server 116 through the control system 108 and the premises communication hub 102.

Other examples of the control system 108 and the one or more devices 110, 112 can include a Bluetooth network, a wireless mesh network, a local area network (LAN), or other networks. The control system 108 and the one or more devices 110, 112 are not limited to networks or security systems and a person having ordinary skill in the art will understand other configurations are contemplated. For example, the control system 108 can be a primary device in direct communication with the premises communication hub with the one or more devices 110, 112 being secondary devices in communication with the premises communication hub 102 through the primary device. In some examples, the control system 108 can be considered a premises device as it is within the premises 114. Additionally or alternatively, in some examples, the one or more devices 110, 112 can be considered premises devices as they are within the premises 114.

In addition to the devices 110 and 112 within the control system 108, the one or more devices 104, 106 can be within the premises 114 and can be considered premises devices. In contrast to the devices 110, 112 which are within the control system 108 and communicate through the control system 108 with the premises communication hub 102, the one or more premises devices 104, 106 can communicate directly with the premises communication hub 102. For example, the one or more premises devices 104, 106 can be security devices such as video cameras, alarms, motion detectors, contact sensors, and other security devices. In some examples, the one or more premises devices 104, 106 can be smoke detectors, carbon monoxide detectors, water leak detectors, and/or other sensors and detectors. In some embodiments, the one or more premises devices 104, 106 can be configured for life safety applications (e.g. smoke detectors, panic button devices). In some such embodiments, the one or more premises devices 104, 106 can have backup power which can provide power to the devices when the main power for these devices is unavailable. For example, the device 104 can be a smoke detector which is hardwired to the electrical power of a building but has a backup battery in case the electrical power of the building fails. While some specific embodiments of the one or more premises devices 104, 106 have been disclosed, a person having ordinary skill in the art will recognize that the one or more premises devices 104, 106 can be any devices which communicate with the premises communication hub 102 and are not limited to the above embodiments.

In the embodiments of FIG. 1, the lines showing communications between the elements can be wired communications, wireless communications, or a combination thereof. For example, the one or more devices 110, 112 can be wireless devices in wireless communication with the control system 108, with the control system 108 being in wired communication with the premises communication hub 102.

In operation of the embodiment of FIG. 1, the premises communication hub 102 can send and/or receive signals, which can include data (e.g. visual image data from a video camera, data as to a predetermined condition) to and from the elements to which it is connected. In some embodiments, the premises communication hub 102 can send and/or receive signals from the elements (e.g. one or more premises devices 104, 106) sequentially. However, in some embodiments, the premises communication hub 102 can send and/or receive signals from the elements simultaneously. In some example operations of FIG. 1, the premises communication hub 102 can receive signals from the elements within the premises 114, send the received signals to the remote server 116 outside the premises 114, receive signals from the remote server 116, and send the signals received from the remote server 116 to the elements within the premises 114. In some such embodiments, the premises communication hub 102 can act as a router which routes signals, for instance, to and from devices within the premises 114 and the remote server 116.

Figure 2:
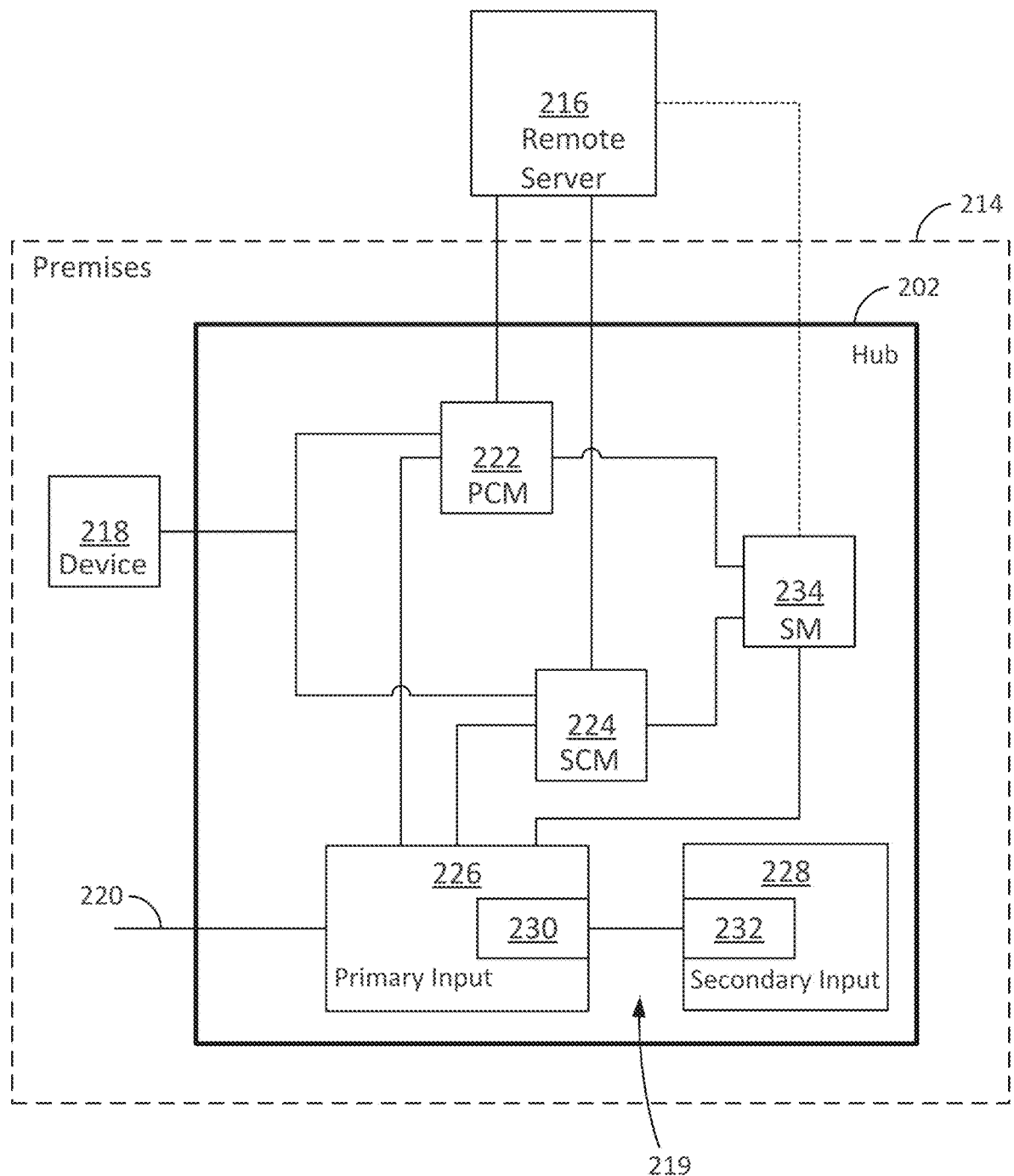
FIG. 2 is a block diagram of an embodiment of a premises communication hub and its connections according to an aspect of the present disclosure.

Moving to FIG. 2, FIG. 2 is a block diagram of an example premises communication hub 202 and its connections according to an aspect of the present disclosure. The premises communication hub 202 is located within the premises 214, such as shown in FIG. 1. The premises communication hub 202 is connected to a premises device 218, primary power source 220, and a remote server 216 which is located outside of the premises 214.

The premises communication hub 202 comprises a primary communications module 222 and a secondary communications module 224. The premises communication hub 202 further includes a power supply 219. The power supply 219 includes a primary power input 226 configured to receive power from the primary power source 220, and the power supply 219 includes a secondary power input 228 configured to receive power from a secondary power source 232. The power supply 219 can be electrically connected to the primary communications module 222 and be configured to supply power to the primary communications module 222, and the power supply 219 can be electrically connected to the secondary communications module 224 and be configured to supply power to the secondary communications module 224. And, in the illustrated embodiment, the premises communication hub 202 includes a charging module 230 as well as a supervision module 234. The charging module 230 can be electrically connected to the secondary power source 232 and be configured to recharge the secondary power source 232. For example, the secondary power source 232 can include a battery, while the primary power source 220 can include a hardwired mains power source.

While one premises device 218 is illustrated in the embodiment of FIG. 2, more than one premises device 218 can be in communication with and connected to the premises communication hub 202. The premises device 218 can be any type of device, but in some examples, the premises device comprises a life safety device. Examples where the premises device can be a life safety device include smoke detectors, heat detectors, carbon monoxide detectors, a medical panic device, a police panic device, a window sensor, a door sensor, security devices, video cameras, locks, and motion detectors. Other life safety devices are contemplated and one of ordinary skill will appreciate this disclosure is not limited to the above list of devices.

Continuing with the embodiment of FIG. 2, the premises device 218 is in communication with the primary communications module 222 and the secondary communications module 224. In some embodiments, the premises device 218 can be in communication with both the primary communications module 222 and the secondary communications module 224 simultaneously. Alternatively, in some embodiments, the premises device 218 can be in communication with one of the primary communications module 222 or the secondary communications module 224. In some embodiments, the premises device 218 can switch between the primary communications module 222 and the secondary communications module 224 such that the premises device is in communication with one of the communications modules at a time. In some such embodiments, the premises communication hub 202 can be configured to switch which communications module the premises device 218 is connected to.

In some embodiments, more than one premises device 218 can be in communication with the primary communications module 222 and/or the secondary communications module 224. For example, multiple premises devices can be connected to the primary communications module 222 simultaneously. In another example, multiple premises devices can be connected to the secondary communications module 224 simultaneously. In a further example, multiple premises devices can be connected to the primary communications module 222 and multiple premises devices can be connected to the secondary communications module 224 simultaneously. Other configurations of the number of premises devices and communication between the premises devices and the primary and secondary communications modules are contemplated. In some embodiments, the primary communications module 222 is in communication with the secondary communications module 224.

In the embodiment of FIG. 2, the primary communications module 222 and the secondary communications module 224 are each in communication with the premises device 218, the remote server 216, and with the supervision module 234. Further in FIG. 2, the primary communications module 222, the secondary communications module 224, and the supervision module 234 are in communication with the primary power input 226. In some embodiments, the primary communications module 222, the secondary communications module 224, and/or the supervision module 234 are in communication with the secondary power input 228. In some such embodiments, any one or more of the primary communications module 222, the secondary communications module 224, and the supervision module 234 can be in communication with both the primary power input 226 and the secondary power input 228. Alternatively, in some embodiments, such as the exemplary embodiment of FIG. 2, the primary power input 226 can be in electrical connection with the secondary power input 228. Accordingly, in some such embodiments, the secondary power input 228 is in communication with the primary communications module 222, the secondary communications module 224, and/or the supervision module 234 through the primary power input 226. This configuration can be advantageous as fewer resources (e.g. power electronics) can be required.

Continuing with the embodiment of FIG. 2, the primary power input 226 is in communication with the primary power source 220 which is within the premises 214. The primary power source 220 can provide power in the form of electricity to the primary power input 226. The primary power source 220 can be any type of electrical power and can include electrical power from an electric grid and local power (e.g. generator, solar panels). In some embodiments, the primary power input 226 is plugged into an electrical outlet. However, in some examples, the primary power input 226 does not receive power from the primary power source 220. In some such examples, the primary power input 226 can include its own power source, such as a battery, which can provide power to the elements of the premises communication hub 202 in operation.

In operation of the embodiment shown in FIG. 2, the primary power input 226 can receive power (e.g. from primary power source 220) and can provide power to various components of the premises communication hub 202. For example, in some embodiments, the primary power input 226 can be electrically connected to the primary communications module 222 and can be configured to supply power to the primary communications module 222. Additionally or alternatively, in some embodiments, the primary power input 226 is electrically connected to the secondary communications module 224 and can be configured to supply power to the secondary communications module 224. The primary power input 226 can also be electrically connected to the supervision module 234 and can be configured to supply power to the supervision module 234.

In FIG. 2, the secondary power input 228 can provide power to various components of the premises communication hub 202. In order to provide power to the various components of the premises communication hub 202, the secondary power input 228 can include an energy source such as the battery 232. In some examples, the secondary power input 228 can be connected to an electrical power source (e.g. power source 220) to provide power to the components of the premises communication hub 202. In some such examples, the electrical power source connected to the secondary power input 228 can be a different electrical power source than the electrical power source which is connected to the primary power input 226. For example, the electrical power source which is connected to the primary power input 226 can provide power from an electrical grid while the electrical power source connected to the secondary power input 228 can provide power from a generator or a battery backup system. However, in some embodiments, the secondary power input 228 includes its own power source and can provide power independently from the primary power source 220. In some such embodiments, the secondary power input 228 includes the battery 232. In some further embodiments, the secondary power input 228 includes a battery which can provide power for at least 24 continuous hours of operation of the premises communication hub 202.

In further operation of FIG. 2, the secondary power input 228 can be electrically connected to the secondary communications module 224 and can be configured to supply power to the secondary communications module 224. In some examples, the secondary power input 228 can be electrically connected to the primary power input 226 such that it is electrically connected to the secondary communications module 224 through the primary power input 226. Alternatively, in some examples, the secondary power input 228 can be directly connected to the secondary communications module 224. In some embodiments, the secondary power input 228 can be electrically connected to the primary communications module 222 and can be configured to supply power to the primary communications module 222. In some such examples, the secondary power input 228 is electrically connected to the primary communications module 222 through the primary power input 226. The secondary power input 228 can also be electrically connected to the supervision module 234 and can be configured to supply power to the supervision module 234.

As illustrated in the embodiment of FIG. 2, the premises communication hub 202 can include a charging module 230. The charging module 230 can be electrically connected to the secondary power input 228. In some examples, the charging module 230 is a part of the primary power input 226 and the charging module 230 is electrically connected to the secondary power input 228 through the primary power input 226. However, in some examples, the charging module 230 is separate from the primary power input 226 and is electrically connected to the secondary power input 228. In operation, the charging module 230 can be configured to charge or recharge the secondary power input 228. For example, the charging module 230 can provide power to the secondary power input 228, which includes the secondary power source (e.g., battery) 232, and can charge or recharge the secondary power source (e.g., battery) 232. In some embodiments, the charging module 230 can receive power from the primary power source 220 to provide power to the secondary power input 228 and charge or recharge the battery 232. In some such examples, the charging module 230 can receive power from the primary power source 220 through the primary power input 226 to charge or recharge the battery 232. Charging module 230 can be advantageous as in the event the secondary power input 228 is used (e.g. when the primary power input 226 is inoperable), the secondary power input 228 can be fully charged and ready for operational power supply. Additionally, in the event the secondary power input 228 is no longer needed (e.g. when the primary power input 226 is operable again), the charging module can recharge the secondary power input 228 back to a full charge.

Continuing with an example operation of the embodiment of FIG. 2, the primary communications module 222 can be configured to receive signals from the premises device 218. As described elsewhere herein, the premises device 218 can be any device which can communicate with the premises communication hub 202. In some examples, the premises device 218 can communicate with the premises communication hub 202 in order to communicate with the remote server 216. For example, the premises device 218 can be a smoke detector which ultimately communicates with the internet (e.g. remote server 216) by communicating through the premises communication hub 202. In some embodiments, the premises device 218 can send signals, such as premises signals providing information relating to a monitored premise condition, to the primary communications module 222 of the premises communication hub 202, which can further transmit the received signals externally to the remote server 216. The primary communications module 222 can be configured to receive the signals (e.g. premises signals) from the premises device 218 via various protocols, including a standard IoT protocol. In some embodiments, the primary communications module 222 is configured to receive a premises signal from the premises device 218 and transmit an external signal to the remote server 216. The external signal can be a modified version of the premises signal, but in some examples, the external signal is the premises signal sent externally outside the premises 214.

In some embodiments, the primary communications module 222 comprises an ethernet module which is configured to transmit signals (e.g. an external signal) to the remote server 216. In some embodiments, the primary communications module 222 comprises a Wi-Fi module configured to transmit signals to the remote server 216. In some further embodiments, the primary communications module 222 comprises a cellular communication module configured to transmit signals to the remote server 216 via a cellular network. In some examples, the primary communications module 222 can comprise more than one module configured to transmit signals to the remote server 216. Similarly, the secondary communications module 224 can comprise an ethernet module, a Wi-Fi module, and/or a cellular communication module configured to transmit signals (e.g. an external signal) to the remote server 216. In some embodiments, the secondary communications module 224 comprises a cellular communication module while the primary communications module 222 comprises an ethernet and/or a Wi-Fi communication module. In such configurations, the primary and the secondary communications modules 222, 224 comprise different modules which can transmit signals to the remote server, which can increase reliability should one of the ethernet, Wi-Fi, or cellular communication modules fail. Further, if the primary communications module 222 comprises an ethernet and/or Wi-Fi module, the primary communications module 222 can have a higher throughput of signals. However, if the secondary communications module 224 comprises a cellular communication module, the secondary communications module 224 can be more reliable in transmitting signals to the remote server 216 as the ethernet and/or Wi-Fi modules can be affected by losses of power and/or premise network outages, as is described elsewhere herein.

In some embodiments, the premises device 218 can send signals, such as premises signals, to the secondary communications module 224 of the premises communication hub 202. The primary communications module 222 can be configured to receive the signals (e.g. premises signals) from the premises device 218 via various protocols, including a standard IoT protocol. The secondary communications module 224 can further send the received signals externally to the remote server 216. In some embodiments, the secondary communications module 224 is configured to receive a premises signal from the premises device 218 and transmit an external signal to the remote server 216. The external signal can be a modified version of the premises signal, but in some examples, the external signal is the premises signal sent externally outside the premises 214.

In the embodiment of FIG. 2, the premises communication hub 202 includes a supervision module 234. The supervision module 234 can be in communication with, and electrically connected to, both the primary communications module 222 and the secondary communications module 224. The supervision module 234 can also be configured to monitor various communication channels. In some embodiments, the supervision module 234 can be configured to monitor a status of a communication channel between the premises device 218 and at least one of the primary communications module 222 and the secondary communications module 224. A communication channel can be the connections, wired or wireless, between the various devices within the premises 214, and in some examples, includes the connections outside the premises (e.g. to the remote server 216). For example, a communication channel can be the connection between the premises device 218 and the primary communications module 222.

In order to monitor the status of the various communication channels, the supervision module 234 can send a signal (e.g. a heartbeat signal) to one or more of the devices (e.g. premises device 218) and/or modules (e.g. primary communications module 222). The devices and/or modules can be configured to return a corresponding signal back to the supervision module 234 if such devices are operating normally and can be further configured to refrain from sending the signal back to the supervision module 234 if they are not operating normally. In some embodiments, the signals are continuous signals. In some embodiments, the signals are period signals transmitted at preset time intervals. In some embodiments, the supervision module 234 only receives signals (e.g. heartbeat signals) from the one or more devices and/or modules. In some such embodiments, the supervision module 234 can be configured to determine that the one or more devices and/or modules are operating normally as long as the corresponding return signals are being received and can further be configured to determine that the one or more devices and/or modules are not operating normally if the corresponding return signals are no longer being received. For example, the primary communications module 222 can be configured to send a heartbeat signal to the supervision module 234 when it is in communication with the premises device 218 and is receiving power. If the primary communications module 222 stops receiving power, the heartbeat signal can stop. At which point, the supervision module 234 can detect that the communication channel between the premises device 218 and the primary communications module 222 is down. Other configurations for the supervision module 234 monitoring the status of communication channels between the premises device 218 and at least one of the primary communications module 222 and the secondary communications module 224 are contemplated.

In some embodiments, if the communication channel between the premises device 218 and the at least one of the primary communications module 222 and the secondary communications module 224 is inoperable, the supervision module can be configured to cause a notification signal to be transmitted to the remote server 216. In some such embodiments, the supervision module 234 is in direct communication with the remote server. However, in some embodiments, the supervision module 234 uses the secondary communications module 224 to cause a notification signal to be transmitted to the remote server 216. The notification signal, once transmitted to the remote server 216, can be used to alert a predetermined contact (e.g., a user, operator, and/or owner of the premises communication hub 202) of a possible issue with the primary communications module 222, the secondary communications module 224, the premises device 218, and/or the communication channels therebetween. The notification signal can be advantageous as the user, operator, and/or owner of the premises communication hub 202 can understand that a standard operation of the premises communication hub 202 has ceased and that premises communication hub 202 may require attention (e.g., maintenance). In some embodiments, if the communication channel between the premises device 218 and the at least one of the primary communications module 222 and the secondary communications module 224 is inoperable, the supervision module 234 is configured to monitor the status of the communication channel between the premises device 218 and the secondary communications module 224. Thus, in some such embodiments, the supervision module 234 can switch between monitoring the status of the communication channel between the premises device 218 and the primary communications module 222 and between monitoring the status of the communication channel between the premises device 218 and the secondary communications module 224. This configuration can be advantageous as the supervision module does not need to monitor multiple communication channels simultaneously, reducing complexity. However, in some embodiments, the supervision module 234 monitors the status of multiple communication channels (e.g. between the premises device 218 and the primary and secondary communications channels) simultaneously. Such configurations can be advantageous as the supervision module 234 can detect if the communication channel between the premises device 218 and the secondary communications module 224 is inoperable independently of the communication channel between the premises device 218 and the primary communications module 222.

In a further example operation of the embodiment of FIG. 2, if the primary communications module 222 is inoperable, the secondary communications module 224 can be used to send signals received from the premises device 218 to the remote server 216. The secondary communications module 224 can be configured to receive a premises signal from the premises device 218 and transmit an external signal to the remote server when the primary communications module 222 is inoperable. For example, the premises device 218 can be a smoke detector which sends a premises signal (e.g. indicating smoke is present) to the premises communication hub 202 to be sent to the remote server 216. If the primary communications module 222 is inoperable, the secondary communications module 224 can be configured to receive the premises signal and transmit that premises signal externally (e.g. via an external signal) to the remote server 216. This configuration can be advantageous as the secondary communications module 224 can act as a backup for sending signals to the remote server when the primary communications module 222 is not functional.

The secondary communications module 224 can be configured to receive a premises signal from a premises device 218 and transmit an external signal to a remote server 216 in other situations as well. For example, if the primary power input 226 does not supply power to the primary communications module 222, the secondary communications module 224 (e.g., now receiving power via the secondary power input 228) can be configured to receive the premises signal from the premises device 218 and transmit the external signal to the remote server 216. This can provide a backup path for premises signals from the premises device 218 to leave the premises 214 and be received by the remote server 216 if a portion of the premises communication hub 202 becomes inoperable, for instance because a premise power supply (e.g., the primary power source 220) is down or a premise network outage has occurred.

In some other example operations, the secondary power input 228 is configured to supply power to the secondary communications module 224 when the primary communications module 222 is inoperable. In further example operations, the secondary power input 228 is configured to supply power to the secondary communications module 224 when the primary power input 226 does not supply power to the primary communications module 222. The secondary power input 228 can supply power independently of the primary power source 220.

In the example operations in which the primary communications module 222 and/or the primary power input 226 stop working, the secondary communications module 224 and/or the secondary power input 228 are configured to provide backup operation of the premises communication hub 202. Thus, if the primary communications module 222 and/or the primary power input 226 become inoperable, the premises communication hub 202 can ensure that signals (e.g. premises signals) received from the premises device 218 can be transmitted externally (e.g. via external signals) to the remote server 216. This backup configuration for sending premises signals from the premises device to the remote server 216 is especially advantageous for life safety devices. For example, a premises device such as a security camera can detect an intrusion into a premises and attempt to send a premises signal to the remote server 216 (e.g. the internet) to alert authorities. However, the primary communications module 222 and/or the primary power input 226 can become inoperable. In such an example, though, the premises signal can still be transmitted to the remote server 216 to alert the authorities as the secondary power input 228 can provide power independent of the primary power input 226 and the secondary communications module 224 can receive and transmit signals independent of the primary communications module 222.

Figure 3:
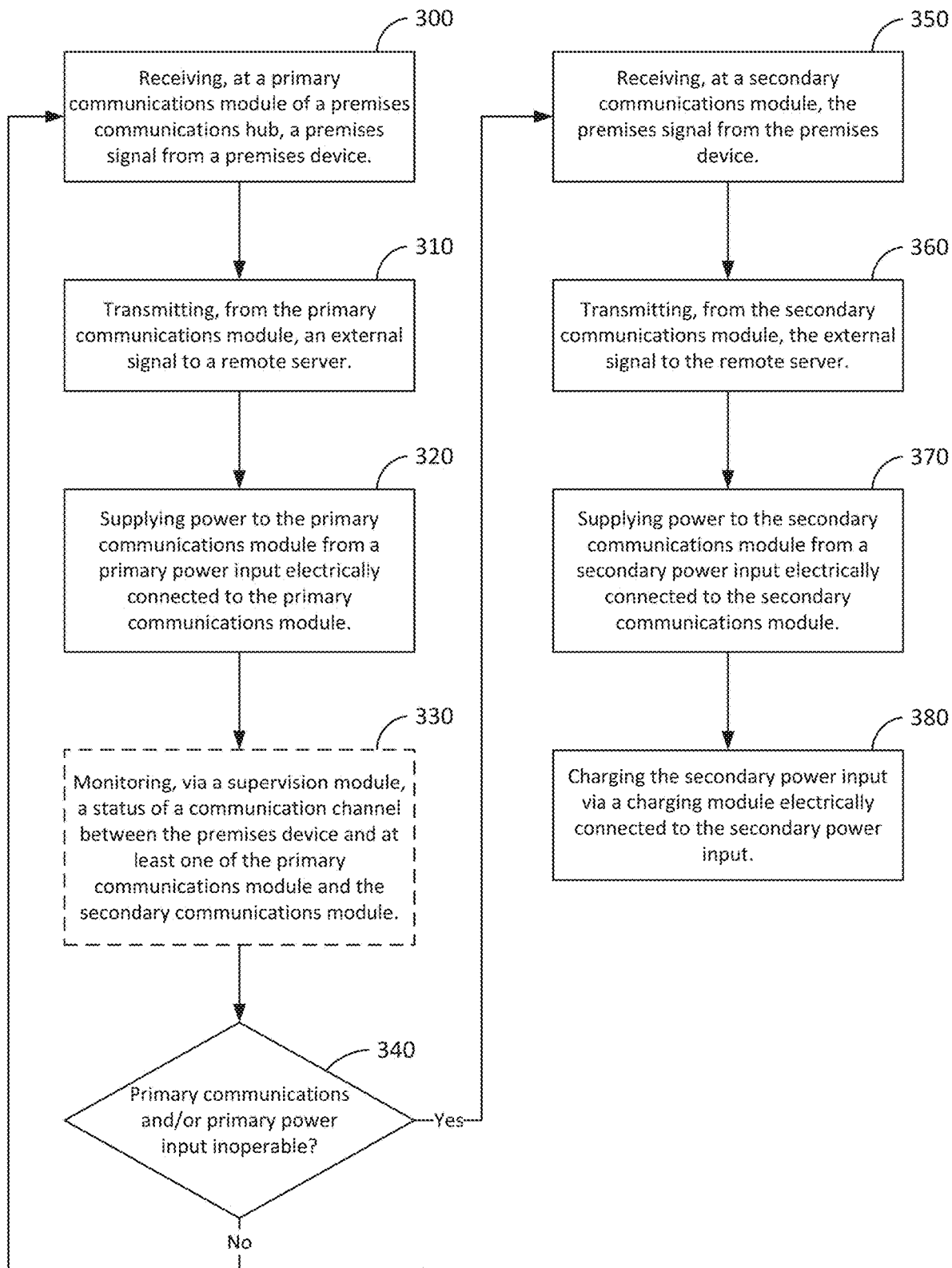
FIG. 3 is a flow diagram of an embodiment of a method of operation according to an aspect of the present disclosure.

Moving to FIG. 3, FIG. 3 is a flow diagram of an example method of operation of an embodiment of the present disclosure. While the steps of FIG. 3 are shown sequentially, the steps can be performed in any order. For example, step 330 can happen before step 300. Furthermore, any of the steps of FIG. 3 can be performed at any time and any of the steps can be performed simultaneously. For example, steps 380 and 320 can be happening simultaneously and steps 300 and 310 can also happen simultaneously.

Starting with step 300, the method of FIG. 3 comprises receiving, at a primary communications module of a premises communication hub, a premises signal from a premises device. In some examples, the primary communications module receives the premises signal from the premises device via the standard IoT protocol. Moving to step 310, the method continues with transmitting, from the primary communications module, an external signal to a remote server. In some examples, the external signal corresponds with the premises signal, but differs in that the external signal travels outside a premises to the remote server (e.g. the internet). In some examples, the primary communications module receives the premises signal and transmits the external signal substantially simultaneously such that the premises device is in communication with the remote server. For example, the premises device can be a video camera which is continuously transmitting data to the internet and is receiving instructions from a remote user device through the primary communications module. Further, while steps 300 and 310 indicate the primary communications module receives a premises signal from a premises device, in some examples, the primary communications module receives more than one premises signals from more than one premises devices.

The method of FIG. 3 continues with step 320 which is supplying power to the primary communications module from a primary power input electrically connected to the primary communications module. The primary power input can be included at the premises communication hub. As discussed previously herein, the primary power input can supply power to the primary communications module by receiving power from a primary power supply, such as through a wall outlet. In some examples, the primary power input supplies power directly to the primary communications module (e.g. direct wiring). However, in some examples, the primary power supply supplies power indirectly to the primary power input.

Moving to step 330, which is an optional step, the method includes monitoring, via a supervision module, a status of a communication channel between the premises device and at least one of the primary communications module and the secondary communications module. The supervision module can be included in the premises communication hub. Thus, in some examples, a supervision module monitors a status of a communication channel between the premises device and the primary communications module, while in some examples, the supervision module monitors a status of a communication channel between the premises device and the secondary communications module. In some examples, the supervision module monitors the status of both communication channels between the premises device and the primary and the secondary communications modules. In some examples, the supervision module continuously monitors the communication channel(s). In some such examples, the supervision module receives a periodic signal from the primary and/or the secondary communications modules which stops if the corresponding primary and/or secondary communications module is inoperable. Further, in some embodiments, the supervision module can cause a notification signal to be transmitted to the remote server when the communication channel between the premises device and the at least one of the primary communications module and the secondary communications module is inoperable. In some such embodiments, the supervision module causes the notification signal to be transmitted to the remote server via the secondary communications module.

While not necessarily an explicit step, if the primary communications module and/or the primary power input become inoperable, as in step 340, the method can continue with step 350. However, if the primary communications module and the primary power input are operable, the method can continue with step 300. In some examples, at least a portion of step 340 is determined by the supervision module.

Moving to step 350, the method continues with receiving, at a secondary communications module, the premises signal from the premises device. The secondary communications module can be included in the premises communication hub. In some examples, the secondary communications module receives the premises signal from the premises device via the standard IoT protocol. Moving to step 360, the method continues with transmitting, from the secondary communications module, the external signal to the remote server. In some examples, the secondary communications module receives the premises signal and transmits the external signal substantially simultaneously such that the premises device is in communication with the remote server. For example, the premises device can be a video camera which is continuously transmitting data to the internet and is receiving instructions from a remote user device through the secondary communications module. Further, while steps 350 and 360 indicate the secondary communications module receives a premises signal from a premises device, in some examples, the secondary communications module receives more than one premises signals from more than one premises devices.

The method of FIG. 3 continues with step 370 which is supplying power to the secondary communications module from a secondary power input electrically connected to the secondary communications module. The secondary power input can be included at the premises communication hub. As discussed previously herein, the secondary power source can include a battery which can supply power to the secondary communications module. In some examples, the secondary power input supplies power directly to the secondary communications module (e.g. direct wiring). In some examples, the secondary power source supplies power indirectly to the secondary power input. By using a battery, the secondary power supply can ensure the secondary communications module is operable in the event of a power failure or loss of power. The use of both the secondary communications module and the secondary power supply can also help to ensure any premises signals from the premises device are able to be transmitted to the remote server in the event either or both of the primary communications module and the primary power input are inoperable.

Step 380 of the method of FIG. 3 is charging the secondary power source, such as a battery, via a charging module electrically connected to the secondary power source. This step can ensure that the secondary power input has as much power as possible to supply to the secondary communications module in the event the secondary power input is needed. For example, the secondary power source can include a battery which can be recharged after it has been used. In a further example, the primary power input can become operable after being inoperable for a period of time.

In such example, the primary power input can provide power to charge the battery of the secondary power input to replenish the power used when the primary power input was inoperable for the period of time. In some examples, after step 380, the method can continue again with step 300.

Various examples have been described. These and other examples are within the scope of the following claims.

What is claimed is:

1. A premises communication hub comprising:
a primary communications module configured to receive a premises signal from a premises device and transmit an external signal to a remote server;
a secondary communications module configured to receive the premises signal from the premises device and transmit the external signal to the remote server;
a power supply comprising a primary power input configured to receive power from a primary power source and a secondary power input configured to receive power from a secondary power source, the power supply electrically connected to the primary communications module and configured to supply power to the primary communications module, and the power supply electrically connected to the secondary communications module and configured to supply power to the secondary communications module;
a charging module electrically connected to the secondary power source and configured to recharge the secondary power source; and
a supervision module configured to monitor a status of a communication channel between the premises device and at least one of the primary communications module and the secondary communications module, and
wherein when the communication channel between the premises device and the at least one of the primary communications module and the secondary communications module is inoperable, the supervision module is configured to cause a notification signal to be transmitted to the remote server.

2. The premises communication hub of claim 1, wherein the supervision module is configured to monitor the status of the communication channel between the premises device and the secondary communications module, wherein the supervision module is electrically connected to the power supply, and wherein the supervision module is configured to cause the notification signal to be transmitted to the remote server via the secondary communications module.

3. The premises communication hub of claim 1, wherein the premises device comprises a life safety device.

4. The premises communication hub of claim 1, wherein the secondary communications module is configured to receive the premises signal from the premises device and transmit the external signal to the remote server when the primary communications module is inoperable.

5. The premises communication hub of claim 4, wherein the secondary communications module is configured to receive the premises signal from the premises device and transmit the external signal to the remote server when the power supply does not receive power from the primary power source.

6. The premises communication hub of claim 4, wherein the power supply is configured to supply power, from the secondary power source, to the secondary communications module when the primary communications module is inoperable.

7. The premises communication hub of claim 6, wherein the power supply is configured to supply power, from the secondary power source, to the secondary communications module when the power supply does not receive power from the primary power source.

8. The premises communication hub of claim 1, wherein the primary communications module is configured to receive the premises signal from the premises device via a standard Internet of Things (IoT) protocol, and wherein the secondary communications module is configured to receive the premises signal from the premises device via the standard IoT protocol.

9. The premises communication hub of claim 1, wherein the secondary communications module comprises a cellular communication module configured to transmit the external signal via a cellular network.

10. The premises communication hub of claim 1, wherein the secondary power source comprises a battery.

11. A system comprising:
a remote server located away from a premises;
a premises device located at the premises; and
a premises communication hub located at the premises, wherein the premises communication hub comprises:
a primary communications module configured to receive a premises signal from the premises device and transmit an external signal to the remote server;
a secondary communications module configured to receive the premises signal from the premises device and transmit the external signal to the remote server;
a power supply comprising a primary power input configured to receive power from a primary power source and a secondary power input configured to receive power from a secondary power source, the power supply electrically connected to the primary communications module and configured to supply power to the primary communications module, and the power supply electrically connected to the secondary communications module and configured to supply power to the secondary communications module;
a charging module electrically connected to the secondary power source and configured to recharge the secondary power source; and
a supervision module configured to monitor a status of a communication channel between the premises device and at least one of the primary communications module and the secondary communications module, and
wherein when the communication channel between the premises device and the at least one of the primary communications module and the secondary communications module is inoperable, the supervision module is configured to cause a notification signal to be transmitted to the remote server.

12. The system of claim 11, wherein the premises device is selected from the group consisting of: a smoke detector, a heat detector, a carbon monoxide detector, a medical panic device, a police panic device, a window sensor, and a door sensor.

13. A method comprising the steps of:
receiving, at a primary communications module of a premises communication hub, a premises signal from a premises device and transmitting, from the primary communications module of the premises communication hub, an external signal to a remote server;
supplying power to the primary communications module from a power supply of the premises communication hub, the power supply comprising a primary power input configured to receive power from a primary power source, the power supply electrically connected to the primary communications module;
when the primary communications module is inoperable, receiving, at a secondary communications module of the premises communication hub, the premises signal from the premises device and transmitting, from the secondary communications module of the premises communication hub, the external signal to the remote server;
supplying power to the secondary communications module from the power supply of the premises communication hub, the power supply comprising a secondary power input configured to receive power from a secondary power source, the power supply electrically connected to the secondary communications module, wherein power is supplied from the power supply to the secondary communications module when the primary communications module is inoperable; and
charging the secondary power source via a charging module of the premises communication hub electrically connected to the secondary power source; and
monitoring, via a supervision module of the premises communication hub, a status of a communication channel between the premises device and at least one of the primary communications module and the secondary communications module,
wherein when the communication channel between the premises device and the at least one of the primary communications module and the secondary communications module is inoperable, causing, via the supervision module, a notification signal to be transmitted to the remote server.

14. The method of claim 13, wherein the secondary communications module comprises a cellular communication module, and wherein the external signal is transmitted from the secondary communications module via a cellular network.

15. The method of claim 13, wherein the supervision module monitors the status of the communication channel between the premises device and the secondary communications module, and wherein the supervision module causes the notification signal to be transmitted to the remote server via the secondary communications module.

16. The method of claim 13, wherein the primary communications module receives the premises signal from the premises device via a standard Internet of Things (IoT) protocol, and wherein the secondary communications module receives the premises signal from the premises device via the standard IoT protocol.

* * * * *